United States Patent [19]

Araki et al.

[11] Patent Number: 4,504,910
[45] Date of Patent: Mar. 12, 1985

[54] PRESENT POSITION DISPLAY DEVICE

[75] Inventors: Shigeru Araki, Tamayama; Nobuhiko Suzuki, Tokyo, both of Japan

[73] Assignee: Alps Electric Co., Ltd., Tokyo, Japan

[21] Appl. No.: 325,303

[22] Filed: Nov. 27, 1981

[30] Foreign Application Priority Data

Nov. 26, 1980 [JP] Japan .............. 55-169331[U]

[51] Int. Cl.³ ........................................... G06F 15/50
[52] U.S. Cl. ................................... 364/424; 434/153; 353/12; 40/518; 40/471
[58] Field of Search ............... 364/424, 436; 434/153; 40/471, 518; 353/11, 12; 250/202

[56] References Cited

U.S. PATENT DOCUMENTS

| | | | |
|---|---|---|---|
| 2,608,094 | 8/1952 | Best | 353/12 |
| 3,175,460 | 3/1965 | Honick | 353/12 |
| 3,529,084 | 9/1970 | Rich | 250/202 |
| 3,577,120 | 5/1971 | Sherbert, Jr. | 364/424 X |
| 3,711,717 | 1/1973 | Rich et al. | 250/202 |
| 3,865,477 | 2/1975 | Gast | 353/11 |
| 3,945,720 | 3/1976 | Ellis | 353/11 X |
| 4,139,889 | 2/1979 | Ingels | 364/424 X |
| 4,312,577 | 1/1982 | Fitzgerald | 364/424 X |

FOREIGN PATENT DOCUMENTS 55-13880 1/1980 Japan .

Primary Examiner—Thomas M. Heckler
Assistant Examiner—Ronni S. Malamud
Attorney, Agent, or Firm—Guy W. Shoup; Gerard F. Dunne

[57] ABSTRACT

A present position display device suitable for use on automobiles or the like vehicles, having a head member provided with a light-emitting element and a light-receiving element; a driving mechanism for driving the head member in the directions of an X and Y-axes; a mechanism for rotationally driving the driving mechanism; a sheet pack detachably mounted in the vicinity of and in parallel with the plane of movement of the head member; and a map transferrably disposed in the sheet pack; whereby the present position of the vehicle is indicated by the light coming from the light-emitting element on the map. Means are provided to read codes of specific positions marked on the map and to make an indication of the specific position as desired.

23 Claims, 13 Drawing Figures

PRESENT POSITION DISPLAY DEVICE

BACKGROUND OF THE INVENTION

The present invention relates to a display device suitable for use on automobiles and adapted for displaying the present position of the automobile on a map.

Modern automobiles incorporate various electronic control devices such as an engine speed controller, overspeed alarm, anti-skid control and so forth, to contribute to the increased safety of driving and to save energy. This trend gives a rise to a demand for a novel system, i.e. a display device for informing the driver of the present position of the automobile.

Hitherto, there have been proposed various present position display devices. For instance, one of the present inventors has proposed in Japanese Patent Laid-open No. 13880/1970 a display device in which a display unit provided with a map and a position indicator is disposed in the vicinity of the driver's seat to display the present position of the automobile on the map. This present position display device, however, involves a problem. Namely, in this device, the desired course is beforehand marked on the map by a color pencil or the like, and the position indicator is moved along the planned course while rotating the map, in such a manner that the direction of movement of the position indicator always coincides with the direction of running of the automobile. Accordingly, it is necessary to take the trouble of attaching and detaching maps to and from the display unit by means of an adhesive tape or the like, requiring a considerable time and labor.

In this present position display device, the running distance of the automobile is calculated from a signal derived from a detector such as a rotation detector attached to a wheel, and the indicator is made to move in accordance with the calculated output to scan the reverse side of the map to move a spot of light from a light source along the marked planned course thereby to inform the driver of the present position of the automobile. This device, however, does not have capability to read and display a specific position information on a map such as position of a gas station. In addition, this device lacks the mechanism rigidity and the driving operation of the position indicator is somewhat inaccurate, although the indication is easy to observe for the driver.

SUMMARY OF THE INVENTION

Accordingly, an object of the invention is to provide a present position display device which is improved to facilitate the attaching and detaching of the map to and from the display unit.

Another object of the invention is to provide a present position display device which permits the driver to have a plurality of maps with him and to easily set or replace the maps on the display surface.

Still another object of the invention is to provide a present position display device having the capability to read a specific position information written on the map and to indicate this position.

A further object of the invention is to provide a present position display device in which a position indicator is moved in accordance with the movement of the automobile, wherein means are provided for always maintaining a coincidence between the direction of movement of the indicator and the direction of running of the automobile.

DESCRIPTION OF THE PREFERRED EMBODIMENTS

A preferred embodiment of the invention will be described hereinafter with reference to the accompanying drawings.

Figure 1:
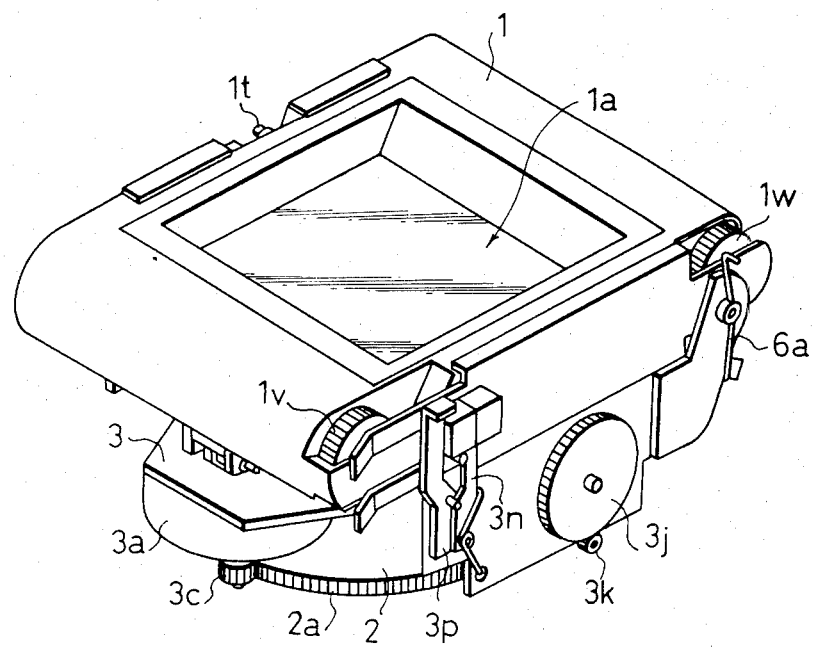
FIG. 1 is a perspective view of a present position display device in accordance with the invention.

FIG. 1 is a perspective view of a display device capable of indicating the present position of an automobile, according to the present invention. The device has a sheet pack 1 accommodating a roll of a plurality of maps. The arrangement is such that any desired one of these maps is presented on a display surface 1a by an automatic or manual operation. The display surface 1a covers a moving region of a head member which will be mentioned later. The maps are printed by an ink on an elongated sheet of a transparent or translucent thin plastic film. If necessary, the printed map may be covered by a thin protecting film of a plastic. At the lower side of the map on the display surface 1a, is a display member adapted to display the present position of the automobile light-emitting elements, and a head member having a road tracing sensor, in such a manner as to be movable in the directions of X and Y axes. The sheet pack 1 is mounted detachably on the present position display device, and is movable in accordance with the changing of the course of the automobile.

Figure 2:
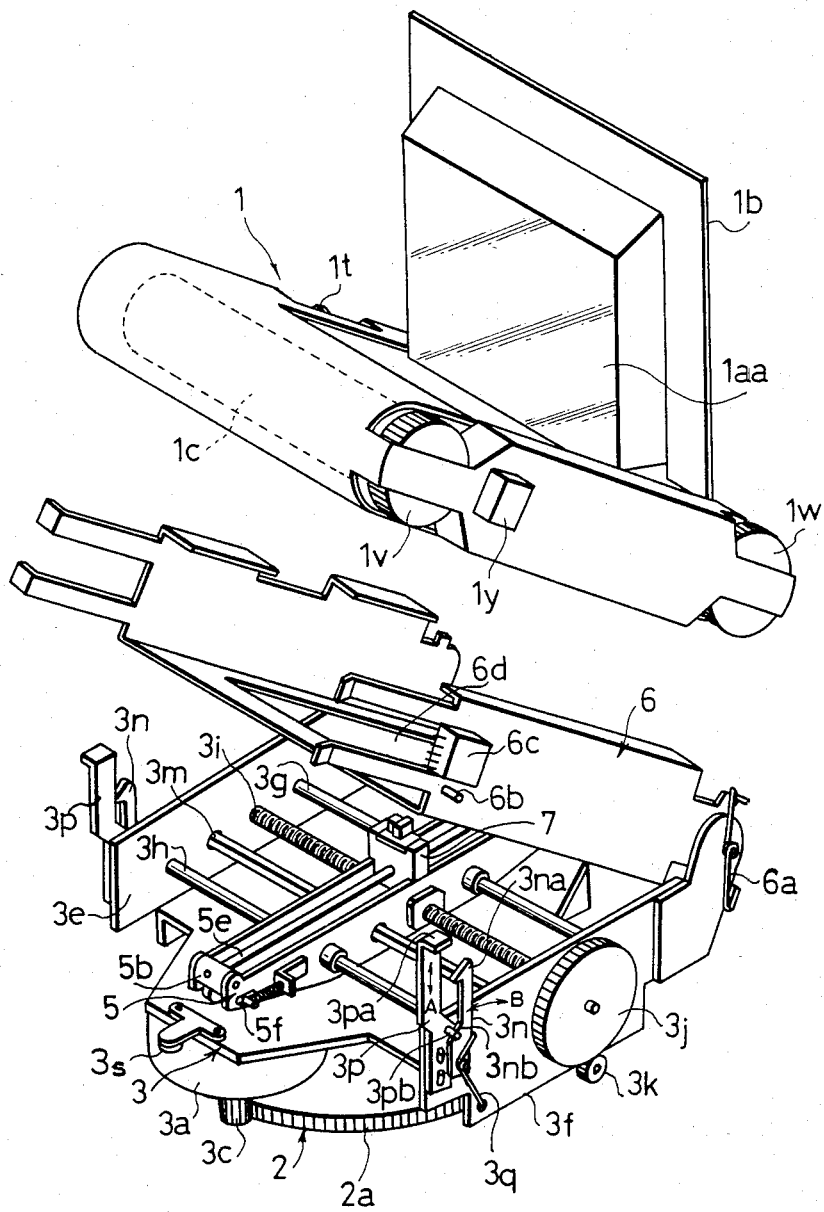
FIG. 2 is a perspective view of the present position display device in the state after removal of a sheet pack.
Figure 3:
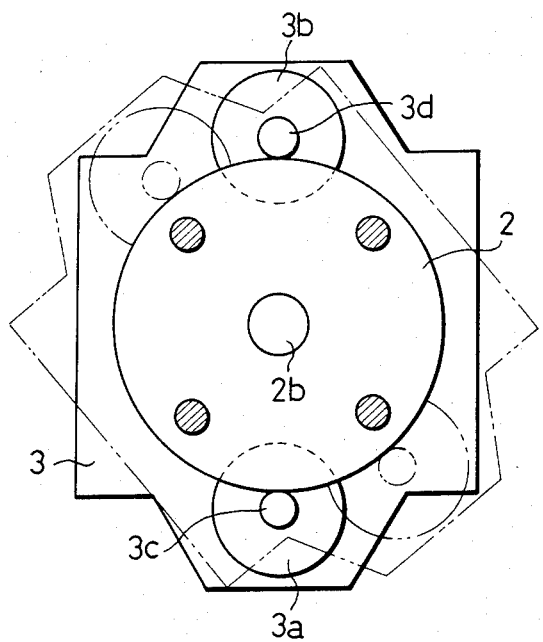
FIG. 3 is a simplified bottom plan view of the present position display device of the invention, showing the rotational positional relationship between a stationary large gear and a turn table.

The detail of the present position display device will be explained hereinafter. FIG. 2 is a perspective view of the device in the state in which the sheet pack 1 has been removed. A stationary large gear 2 has peripheral teeth 2a and is firmly fixed to a suitable stationary part (not shown) of the automobile, e.g. a stationary portion of a front panel. A turn table 3 is mounted, as shown in FIG. 3, rotatably on a shaft 2b protruding from the center of the stationary large gear 2. Two pulse motors 3a, 3b are mounted diametrically across from one another on the turn table 3. Pinions 3c and 3d attached to the rotary shafts of the pulse motors 3a,3b mesh with the teeth 2a of the stationary large gear 2. Therefore, as the pulse motors 3a,3b are rotated, the turn table 3 is rotated from, for example, the position shown by full line to the position shown by two-dot-and-dash line in FIG. 3.

Two side walls 3e,3f are formed to protrude from the sides of the turn table 3, between which are extended four shafts. Among these shafts, two 3h,3g are X-feed guides for guiding a carriage 5 which will be mentioned later. A reference numeral 3i designates an X-feed shaft rotatably mounted on the side walls 3e,3f and having a peripheral screw thread. A gear 3j is attached to one end of the shaft 3i and engages with a pinion 3k which is seucred to the shaft of an X-feed pulse motor (not shown) mounted on the turn table 3. As the X-feed shaft 3i is rotated, the carriage 5 is moved in the X directon through a mechanism which will be described later. A Y-axis feed shaft 3m having a non-circular cross-section extends through the carriage 5 and is splined to a gear of the carriage 5. Although not shown, a pinion of a Y-axis feed pulse motor secured to the lower side of the turn table meshes with a gear provided in the portion of the Y-axis feed shaft 3m projected beyond the side wall 3e.

On the ends of the side walls 3e, 3f, provided respectively are a lock lever 3n for locking a holder frame 6 for mounting the sheet pack 1 and a release lever 3p for rotating the lock lever 3n. The lock lever 3n is mounted for rotation in the direction of an arrow B in FIG. 2, and is rotatably biased toward the release lever 3p by means of the reset spring 3q. The lock lever 3n is provided at its end with a hook 3na and at its intermediate portion with a tapered section 3nb. The release lever 3p is mounted to move slidably in the vertical direction, i.e. in the direction of arrow A in FIG. 2. The release lever 3p is provided at its one end with a pressing portion 3pa and at its intermediate portion with a pin 3pb for contacting the tapered portion 3nb of the lock lever 3n. The arrangement is such that, as the pressing portion 3pa of the release lever 3p is depressed downwardly as viewed in FIG. 2, the pin 3pb presses the tapered portion 3nb of the lock lever 3n, so that the latter is rotated in the clockwise direction as viewed in FIG. 2, overcoming the force of a lock lever reset spring 3q.

To the ends of the side walls 3e, 3f opposite to the release lever 3p, pivotally secured is the aforementioned holder frame 6 adapted for mounting the sheet pack 1. The holder frame 6 is biased by a spring 6a as shown in FIG. 2 to an inclined position for facilitating the insertion of the sheet pack 1. An engaging pin 6b for engaging the hook portion 3na of the lock lever 3n and a connector 6c for supplying electric power to the sheet pack 1 are secured to the side surface of the holder frame 6. Also, the frame 6 is provided at its central portion with a display window 6d.

Figure 4:
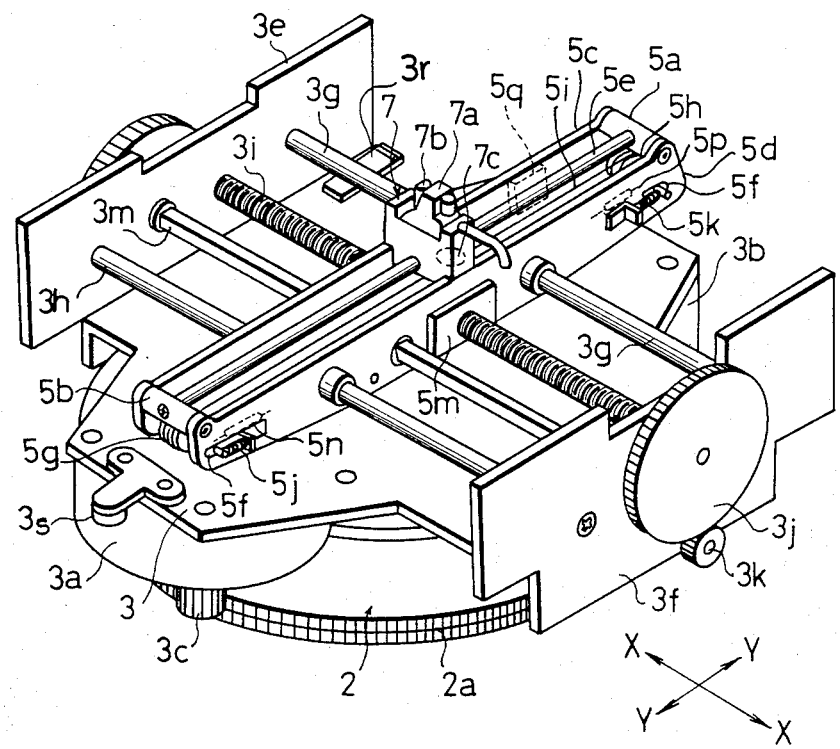
FIG. 4 is a perspective view of the present position display device of the invention, showing the structure on the turn table with the sheet pack detaching mechanism being removed.

As will be seen from FIG. 4, the carriage 5 has two side plates 5c,5d supported by spacers 5a,5b in parallel with each other. Between the spacers 5a,5d, a guide rail 5e is connected in parallel with the side plates 5c,5d. A head member 7 having an indication member 7a and a road tracing sensor 7b fits on the guide rail 5e so as to be able to move along the latter in the longitudinal direction of the carriage 5.

In the described embodiment, the indication member 7a consists of a light-emitting diode, while the road tracing sensor 7b consists of a phototransistor.

Bearing bores 5f elongated in the direction parallel to the guide rail 5e are formed in both ends of the side plates 5c,5d. The bearing bores 5f receive rotary shafts of Y-axis feed pulleys 5g,5h. A reference 5i designates a Y-axis feed wire having one end which is fastened to the head member 7 and goes round a Y-axis feed pulley 5g and runs under the carriage 5. This end of the wire further goes around a drive pulley born by the side plates 5c,5d and is further lead to the upper side of the carriage 5. The other end of the Y-axis feed wire 5i is fastened to the head member 7. The drive pulley has a teeth portion meshing with a gear which is splined to the Y-axis feed shaft 3m. In consequence, as the Y-axis feed shaft 3m rotates, the head member 7 is moved in the longitudinal direction of the carriage 5, i.e. in the direction of the Y-axis. In order to always tighten the Y-axis feed wire 5i to ensure a smooth movement of the head member 7, the shafts of the Y-axis feed pulleys 5g and 5h are continuously biased by springs 5j,5k toward the ends of the carriage 5. The carriage 5 carries a drive bearing 5m which is penetrated by the X-axis feed screw shaft 3i.

Figure 5A:
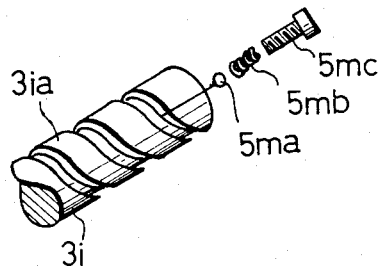
FIG. 5A is a simplified perspective view of a portion of the present position display device, showing a part of an X-feed screw shaft and a part of a drive shaft bearing.
Figure 5B:
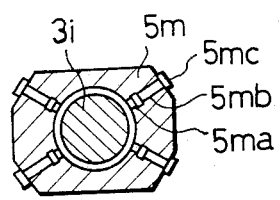
FIG. 5B is a sectional view showing the X-feed screw shaft and the drive shaft bearing.

As will be seen from FIG. 5A, the drive bearing 5m is provided therein with a ball 5ma and a spring 5mb, as well as a screw 5mc. The screw 5mc and the spring 5mb cooperate with each other to press the ball 5ma into the groove 3ia of the X-axis feed screw shaft 3i. Therefore, as the X-axis feed screw shaft 3i rotates, the drive bearing 5m, i.e. the carriage 5 is moved along the X-axis feed screw 3i. In the described embodiment, it is possible to smoothly move the bearing shaft 5n along the X-axis feed screw 3i. In addition, four balls 5ma are provided in the drive bearing 5m, in order to diminish back-lash. Y-axis limit switches 5n,5p are provided at the inside of both ends of the side plate 5d of the carriage 5, to signal movement of the head member 7 beyond the limit positions, while the head member 7 is provided with a solenoid 7c for actuating these Y-axis limit switches 5n,5p. An X-axis limit switch 3r is disposed on the turn table 3 in the vicinity of the side wall 3e. A magnet 5q is attached to the side plate 5c of the carriage 5 so as to oppose to the X-axis limit switch 3r in its extreme left position of FIG. 4. Although not shown, a similar X-axis limit switch is disposed in the vicinity of the side wall 3f. At the end of the turn table 3 is a magnet 3s for detecting the rotation of the turn table 3. Although not shown, two θ limit switches are mounted on the substrate to which the stationary large gear 2 is fixed. These limit switches act to prevent the turn table 3 from rotating more than one full turn.

Figure 6:
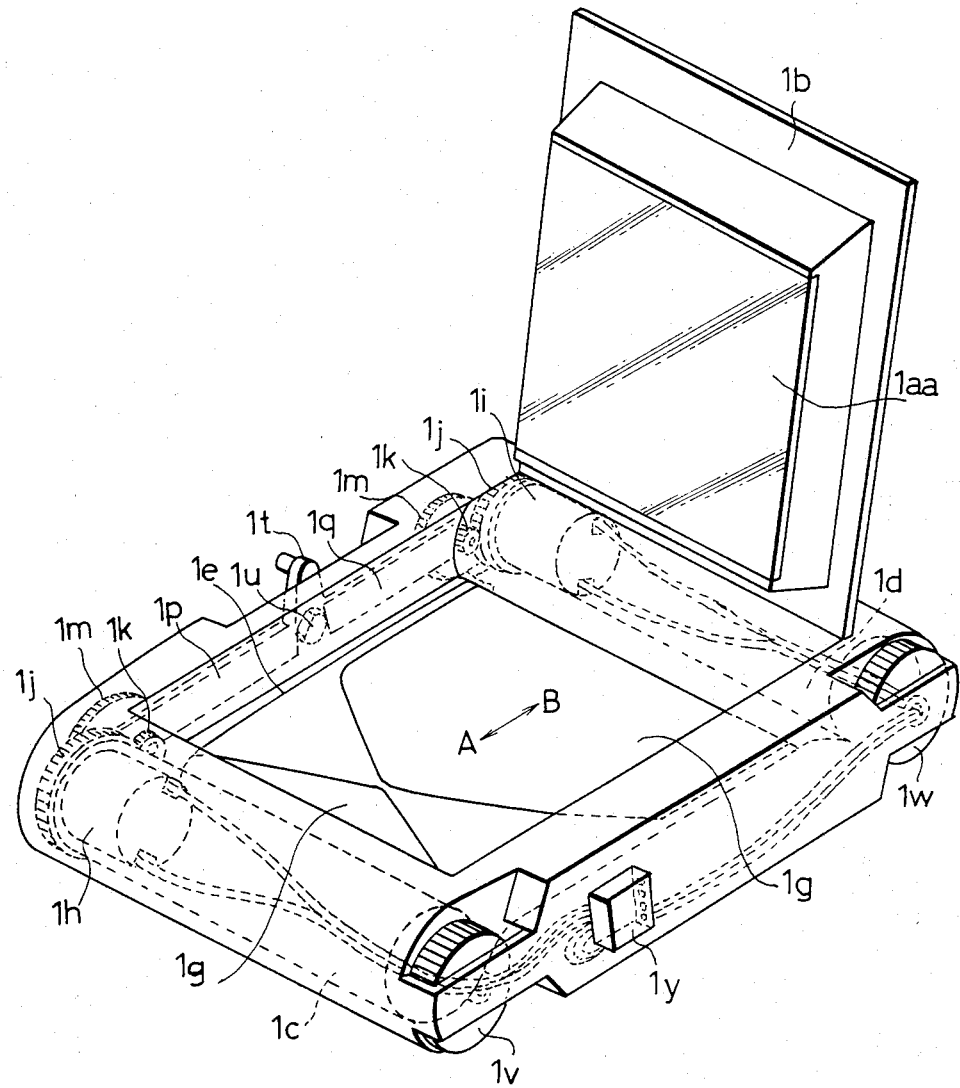
FIG. 6 is a perspective view of the present position display device of the invention in the state in which a door of the sheet pack is opened.
Figure 7:
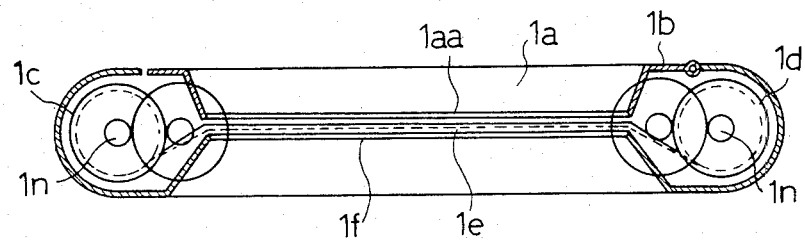
FIG. 7 is a simplified sectional view of a sheet pack in the present position display device of the invention.

Referring now to FIG. 6 which is a partly transparent perspective view of the sheet pack 1 showing the inside of the latter, a door 1b attached to the upper side of the sheet pack 1 has a half mirror 1aa which covers the display surface 1a. As will be understood from FIG. 7, take-up drums 1c, 1d are rotatably secured to respective ends of the sheet pack 1. A transfer sheet 1e made of a transparent film is wound round the take-up drums 1c, 1d. The arrangement is such that, as the take-up drums 1c,1d are rotated, the transfer sheet 1e moves through the gap formed between the half mirror 1aa and an underlying transparent window 1f.

A plurality of maps 1g are successively mounted on the transfer sheet 1e and are wound in the take-up drums 1c,1d together with the transfer sheet 1e and are accommodated by the accommodating sections provided at both sides of the sheet pack 1. Accordingly, it is possible to present the desired map on the display surface 1a as the take-up drums 1c,1d are rotated.

Figure 8:
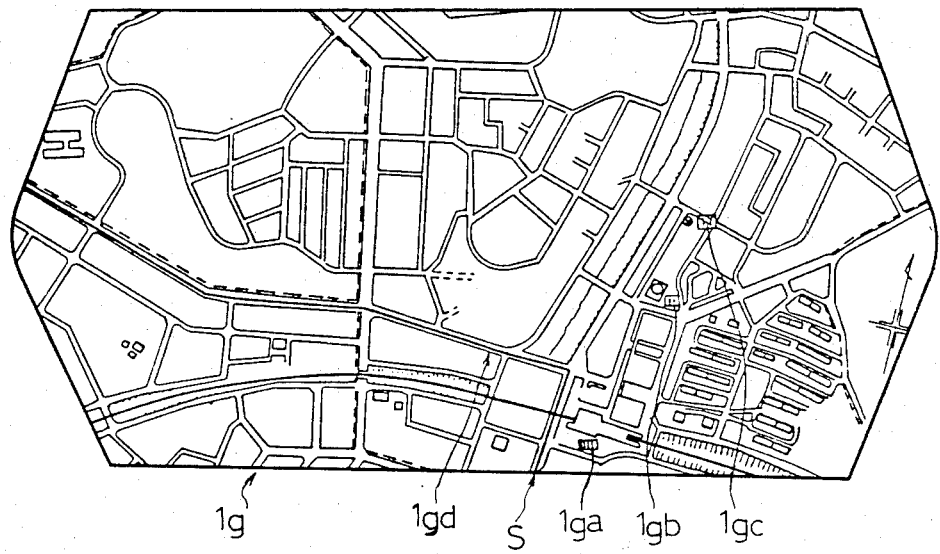
FIG. 8 is a plan view of an example of the map used in the present position display device of the invention.

As will be seen from FIG. 8, specific bar codes are given for objects such as station 1ga, post office 1gb, gas station 1gc and so forth on the map. Also, a planned running course 1gd is marked on the map. These bar codes and the planned running course are scribed by a pen or a dye which is specifically sensible by the road tracing sensor 7b. The running course code may be scribed beforehand by a highly viscous ink or the like in advance to the departure.

Figure 9:
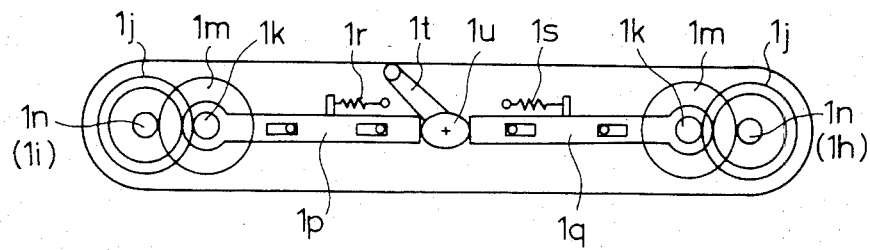
FIGS. 9 and 10 are illustrations of the internal structure of the sheet pack in a partly removed and simplified form, as viewed from the direction opposite to FIG. 7, for explaining the coupling between a drive motor in the sheet pack and a take-up drum.

Small-sized drive motors 1h and 1i are disposed within the take-up drums 1c and 1d. The torques of these motors are transmitted to the take-up drums 1c and 1d through gears 1j, 1k, 1m and so forth, as will be described later. As will be seen from FIG. 9, gears 1n are attached to the rotary shafts of the drive motors 1h and 1i.

At the inside of the sheet pack 1, two gear carriers 1p and 1q are carried slidably in the longitudinal direction. Gear 1m and 1k are coaxially mounted on the ends of the gear carriers 1p and 1q. The gear carriers 1p and 1q are biased toward the center by means of springs 1r and 1s. At the center of the gear carriers 1p and 1q, rotatably carried is a cam 1u having a lever 1t. Also, a gear 1j is secured to each of the take-up drums 1c and 1d. These drums 1c and 1d are provided also with knobs 1v and 1w for manually rotating these drums, as will be understood from FIG. 6. Referring to FIGS. 2 and 6, a reference numeral 1y designates a connector for supplying the drive motor 1h and 1i with the electric power.

An explanation will be made hereinunder as to how the map is mounted on the sheet pack 1.

Figure 10:
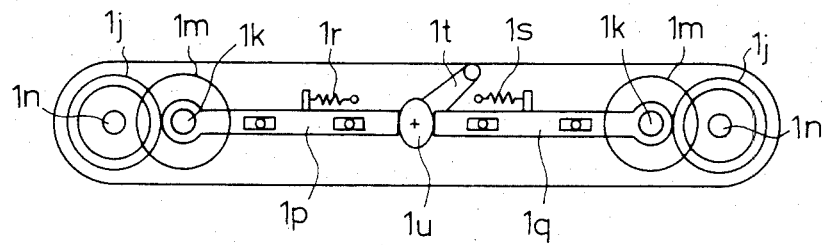

After removing the sheet pack 1 from the holder frame 6, as shown in FIG. 10, the lever 1t is rotated clockwise to disconnect the take-up drums from the drive motor. Then, either the take-up drum 1c or the take-up drum 1d is rotated manually by the knob and, after coiling the transfer sheet 1e into the take-up drum, the door 1b is opened and a map, 1g is placed on the transfer sheet 1e. Then, the knob 1w is rotated to wind up the map 1g into the drum 1d together with the transfer sheet 1e. The placement of the map 1g on the transfer sheet 1e and the winding up of the latter together with the map are repeatedly conducted to take the desired number of maps 1g in the take-up drum 1d. Thereafter, the door 1b is closed and the lever 1t is manipulated to reset the sheet pack 1 to the state shown in FIG. 9.

Thereafter, the sheet pack 1 thus accomodating the maps is inserted into the holder frame 6. In this state, the connector 1y attached to the sheet pack 1 and the connector 6c attached to the holder frame 6 are coupled to each other, so that the electric circuit within the sheet pack 1 is connected to the power source circuit in the present position display device. Thereafter, the holder frame 6 is rotated to make the connecting pin 6b engaged by the hook portion 3na of the lock lever 3n, thus completing the mounting of the sheet pack 1 on the present position display device.

Thereafter, a switch on a control panel (not shown) is operated to actuate the drive motors 1h and 1i in the sheet pack 1 to coil the transfer sheet 1e into the take-up drum 1c to make the map 1g run in the direction of arrow A of FIG. 6 thereby to set the desired one 1g of the maps on the display surface 1a. In this state, the carriage 5 is driven to move the head member 7 in the X-axis direction and the head member 7 itself is moved on the carriage 5 in the Y-axis direction to set the indication member 7a at the starting point (point S in FIG. 8) of the planned running course on the map. Then, the turn table 3 is rotated to make the direction of the planned running course 1gd coincide with the direction of running of the automobile.

The automobile is provided with a detector for detecting the running distance of the automobile. After the automobile has run a predetermined distance, the running distance detector produces a detection signal corresponding to the running distance of the automobile. Upon receipt of this signal, the control circuitry for the present position display device actuates the head member 7 to make the latter scan over a limited area in accordance with a previously control signal previously set in the control circuitry.

Figure 11:
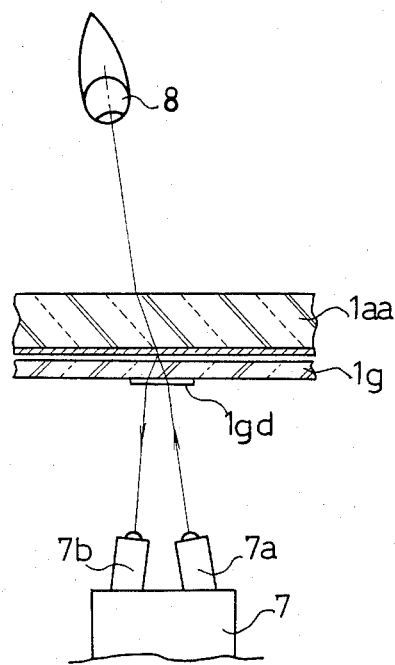
FIG. 11 is a partly cut-away side elevational view of the present position display device of the invention showing particularly the relation among a head member, map and a half mirror.

For instance, the head member 7 may be moved by the control circuitry to travel in a small circular path clockwise or counter-clockwise starting from the point S. During this scanning operation, the light emitted from the indicator 7a passes through the map 1g and is partly reflected by the half mirror 1aa as shown in FIG. 11, and comes into the road tracing sensor 7b. This light has been transmitted twice through the map 1g. The intensity of the light, therefore, is changed in accordance with the information scribed on the map 1g. This change is detected by the road tracing sensor 7b so that the information on the map is read. As the light emitted from the indication member 7a has been moved beyond the planned running course 1gd and detected by the road tracing sensor 7b, the scanning by the head member 7 is stopped and the direction of movement of the automobile on the X-Y coordinate, i.e. the deviation angle, can be calculated from the positional relationship between the present position of the head member 7 and the starting point.

The pulse motors 3a,3b receive signals from the control circuitry forming the controller of the display device in accordance with this deviation angle, and are energized to rotate the turn table 3 by a required angle to maintain the planned running course always in coincidence with the actual running direction of the automobile. The light emitted from the indication member 7a reaches the driver's eyes through the half mirror 1aa, so as to indicate the present position of the automobile on the planned running course described on the map 1g.

This operation is conducted at each time the automobile runs a predetermined distance, so that the present position of the automobile is indicated successively on the planned running course with the planned running course always coinciding with the direction of running of the automobile.

Assume here that a need such as a supply gas has occurred and the driver wishes to know the position of the nearest gas station on the map presently displayed. In such a case, the driver pushes a "gas station search button" on the control panel. As a result, the present position of the automobile is stored in a register within the control circuit, and the head member 7 makes a raster-like scan laterally as viewed in FIG. 8 to read the bar codes of all gas stations of the map presently displayed. Then, the controller calculates the distances between the present position information stored in the register and the gas stations, and, after the determination of the nearest of these gas stations, the head member 7 is moved to the portion of the map corresponding to the location of the nearest of these gas stations to inform the driver of the position of the thus found gas station by a flicker of the indication member 7 or the like.

After confirming the position of the gas station, the driver depresses a "search stop" button, so that the position of the head member 7 is read out and the latter is returned to the original position to show the present position of the automobile. Then, as the automobile comes near the gas station, and the driver wishes to drive into the station apart from the planned running course, he depresses a set button so that the present position of the automobile is set in the register in the same manner as above, and the head member 7 is moved to the position corresponding to the gas station to indicate the position of the gas station. After the supply of the gas at the gas station off from the course, the driver then depresses a reset button when the automobile has gotten back to the position where the automobile was deviated from the course, so that the head member 7 is returned to the planned running course and commences to move along the latter as the automobile runs for the destination. Also, the content of the register is extinguished. If the head member 7 is moved for a search of another point during the period in which the automobile is off from the course, it is possible to reset the head member 7 to the original position on the planned running course, by reading out the position information of the head member from the register and resetting the head member 7 in accordance with the read-out information.

When the automobile has run completely the planned running course scribed on the map, the drive motors 1h, 1i in the sheet pack 1 are actuated to present the next map on the display surface. Then, the above-explained operation is made to move the indication member along the planned running course to display the present position of the automobile. In this case, by arranging such that the tracting side drive motor has a speed slightly higher than that of the forwarding side drive motor, it is possible to apply a small tension to the transfer sheet 1e, so that the feed of the map is smoothly conducted without any wrinkling of the map.

In the embodiment described heretofore, the indication member 7a attached to the head member 7 is slightly inclined to the plane of the map, so that the driver's eyes are averted from the position just above the indication member 7a. This problem, however, is completely overcome in the embodiment shown below.

Figure 12:
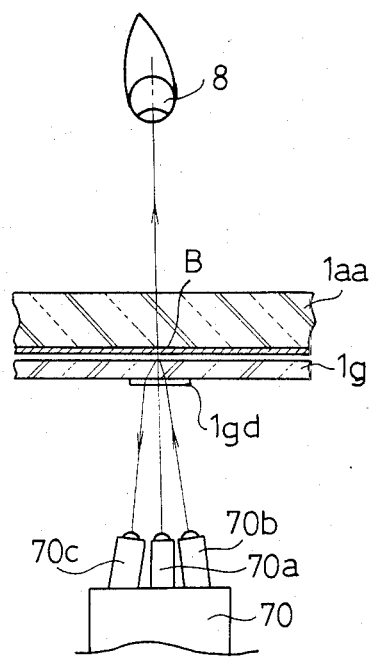
FIG. 12 is a simplified partly cut-away side elevational view of the present position display device of another embodiment of the invention, showing particularly the relationship among the head member, map and the half mirror.

FIG. 12 is a side elevational view of another embodiment improved to avoid the above-stated shortcoming of the first embodiment. A head member 70 is attached to the carriage 5 and is moved on an X-Y table in the same manner as that used in the first embodiment. An indication member 70a for editting a visible ray in the vertical direction is mounted at the center of the head member 70. A light-emitting element 70b for emitting an invisible ray (infrared rays) is secured to one side of the indication member 70a. The invisible ray emitted from the light emitting element 70b reaches a point B where the light coming from the display member 70a comes into the half mirror 1aa. The light which has reached the half mirror 1aa is partly reflected to direct the head member 70. A road tracing sensor 70c is disposed at an intermediate portion of the light path, and the lower end of the sensor 70c is secured to the head member 70.

In this embodiment, the reading of information on the map is conducted by a cooperation of the light-emitting element 70b and the road tracing sensor 70c in the same manner as that of the first embodiment. A part of the invisible ray emitted from the light-emitting element 70b runs through the light emitting element 70b but this part of invisible ray cannot be recognized by the driver's eyes. On the other hand, the visible light emitted from the indication member 70a runs vertically to indicate the present position of the automobile, so that present position can be recognized accurately from a position just above the head member 70.

The embodiments heretofore described are not exclusive, and the invention can be applied to such an information display device having a detector for producing a running speed signal, a detector for producing a rotation direction signal, a control circuit adapted to calculate the locus of running of a vehicle on a map from the running speed signal and the rotational direction signal and a head member adapted to be moved in an X-Y coordinate in accordance with the result of the head member to make an indication member of the head member display the present position of the vehicle on the X-Y coordinate, wherein the map is rotated in accordance with the rotation direction signal to keep the direction of movement of the indication member in coincidence with the actual direction of running of the vehicle.

As has been described, according to the invention, it is possible to read the information without requiring any direct contact with the map, so that the damaging of the map and the noise produced by the contact of the head member with the map are eliminated, and the head member can move without encountering substantial resistance.

Furthermore, since the information is read out from the information carrier by the change of intensity of light, the bad influence of the environmental condition is suppressed. In addition, the head member has a simple construction easy to fabricate, and can withstand vibration and impact. The present position display device of the invention, therefore, is suitable for use on automobiles.

It is also to be pointed out that the present position display device of the invention has a function to discriminate and display specific position information, so that it is possible to rapidly detect the position of a gas station, hospital or the like object in case of emergency.

It is also to be noted that, since a plurality of maps are accommodated by a sheet pack having a sheet driving mechanism, it is possible to easily and promptly present the designated map on the display surface.

Finally, since the driving mechanism for the sheet pack and the head member on the X-Y coordinate is movable, it is quite easy for the driver to correct the angle of monitor picture surface in relation to the position of the driver and to change the angle of the monitor picture surface following up the direction of running of the vehicle.

What is claimed is:

1. A present position display device adapted to be mounted in a vehicle and comprising:

(a) a head member having light-emitting indication means;
(b) an elongated carriage mounting said head member;
(c) first driving means for moving said head member in an Y-axis direction coinciding with the longitudinal direction of said carriage;
(d) holding means mounting said carriage;
(e) second driving means for driving said carriage on said holding means in an X-axis direction perpendicular to said Y-axis direction;
(f) third means for driving said second driving means and said first driving means in a manner corresponding to the travel of said vehicle;
(g) a sheet pack disposed above and close to a plane where said head member moves;
(h) an indicating window means provided in said sheet pack for rendering said light emitting indication means visible to an operator of said vehicle;
(i) a plurality of maps in said sheet pack each consisting of a transparent or translucent flexible member on which map information is printed;
(j) means for selectively transferring one of said maps to said indicating window means; and
(k) accommodating means within said sheet pack for winding and accommodating maps other than the map positioned in alignment with said indicatint window means.

2. A present position display device as claimed in claim 1, further comprising:
(a) a rotational driving means for rotationally driving said holding means so as to correspond with any change in the direction of movement of said vehicle.

3. A present position display device as claimed in claim 1, wherein said holding means include a mechanism for detachably mounting said sheet pack.

4. A present position display device as claimed in claim 3, wherein said detachable mounting mechanism includes:
(a) means including a holder frame rotatable relatively to said holding means for detachably holding said sheet pack; and
(b) means for immovably retaining said holder frame on said holding means.

5. A present position display device as claimed in claim 3, further comprising:
(a) drive motor mounted in said sheet pack for moving said maps into and from said accommodating means;
(b) a sheet pack connector connected to said drive motor; and
(c) means including a connector provided in said detachable mounting mechanism for supplying said drive motor with electric power.

6. A present position display device as claimed in claim 1, further comprising:
(a) two accommodating sections each provided adjacent a respective side of said indicating window means;
(b) take-up drums disposed in respective accommodating sections; and
(c) means including an elongated and substantially transparent transfer sheet for carrying said maps thereon to transfer said maps successively and integrally into and from said accommodating means, said transfer sheet extending between said take-up drums and wound around said take-up drums.

7. A present position display device as claimed in claim 6, further comprising;
(a) means including a door pivotally secured at its one side to the body of said sheet pack for permitting, in the opened state, said maps in said sheet pact to be detached by means for fingers or the like; and
(b) a thin plate made from a light-transmissive material and provided on said door means, said thin plate constituting a part of said indication window means so as to cover said transfer sheet.

8. A present position display device as claimed in claim 6, wherein each of said take-up drums is provided at its one end with a manually operable knob for rotating said drum.

9. A present position display device as claimed in claim 6, further comprising:
(a) driving motors mounted in said sheet pack and constituting rotational driving means for said take-up drums; and
(b) a gear train operatively connecting said driving motors to respective take-up drums.

10. A present position display device as claimed in claim 9, wherein said driving motors are provided in a pair so as to correspond to said take-up drums, and further including means for driving one of said driving motors at a speed higher than that of the other of said driving motors.

11. A present position display device as claimed in claim 9, wherein a part of said gear train is manually movable to selectively disconnect said take-up drums from the associated driving motor.

12. A present position display device adapted to be mounted in a vehicle and comprising:
(a) a head member provided with a light-emitting element for emitting light and a light-receiving element;
(b) means for moving said head member within a plane and in a manner corresponding to the movement of said vehicle;
(c) means including a half mirror disposed in a plane parallel to and above the plane of movement of said head member so as to cover the region of movement of said head member for reflecting a part of the light element so as to transmit a part of the light from said light emitting element to make it visible; and
(d) means including a map disposed between said head member and said half mirror and consisting of a light permeable sheet, said map having map information printed by a visible material, for enabling said light-receiving element to receive information as differences in intensity of said light.

13. A present position display device as claimed in claim 12, further comprising:
(a) bar codes printed on said map as information of specific positions thereon;
(b) means for scanning said map with said head member to search for said bar codes to identify a detected specific position; and
(c) means for moving said head member to a point corresponding to the detected specific position and to stop said head member at that position in order to indicate said detected specific position.

14. A present position display device as claimed in claim 13, wherein said light emitting element emits an invisible ray while said head member is provided with means including another light-emitting element for emitting a visible ray which vertically runs through said half mirror.

15. A display device for indicating the position of a vehicle, including means for holding a map in a viewing position within said vehicle, said map being formed from a material allowing light to pass therethrough and having opaque portions defining information on said map, means including a half-mirror mounted over the portions of said map viewed by the operator of said vehicle for enabling a portion of light directed from behind said map to pass through to said operator while reflecting a portion of said light back behind said map, a head member mounted for movement behind said map and carrying means for emitting light towards said map and means for receiving reflected light to produce a signal corresponding to information on said map, and means connected to said head member for moving it behind said map as a function of the movement of said vehicle.

16. A display device according to claim 15, said map including opaque bar codes formed thereon for indicating specific locations on said map, said display device further including means for moving said head member to scan said map for any of a selected one of said bar codes and to position said head member beneath the specific position of said maps corresponding to said selected bar code.

17. A display device according to claim 15, said light being in a spectrum invisible to the operator of a vehicle, and said head member including means for emitting light in a spectrum visible to the operator in a direction perpendicular to the plane of said map.

18. A display device for indicating the position of a vehicle, including means for holding a plurality of maps attached together serially in a viewing position within said vehicle, said maps each being formed from a material allowing light to pass therethrough and having opaque portions defining information on the respective maps; said holding means forming a unitary container for said maps and including a central window portion for viewing a map therebelow, means on respective sides of said control window for storing maps and drive means for advancing said maps serially beneath said central window; scan means including a head member mounted movably beneath said container and carrying means for emitting light through said central window portion and said map therebelow for illuminating selected areas of said map, said scan means including means for moving said head member beneath said central window portion as a function of movement of said vehicle.

19. A display device according to claim 18, said holding means and said scan means forming an integrated assembly; and means for turning said assembly in the plane of said central window portion to conform said map therebelow with the direction of travel of said vehicle.

20. A display device according to claim 18, said holding means including means mounting said container detachably to said holding means.

21. A display device according to claim 18, said storing means including a respective take-up drums positioned in opposite sides of said central window for scrolling said maps therepast.

22. A display device according to claim 21, said storing means including door means enabling said maps to be removed and replaced, said door means including a plate member formed of a light-transmissive material and forming at least a part of said central window portion.

23. A display device according to claim 21, at least one of said drums having a knob operable manually for moving a map past said central window portion.

* * * * *

UNITED STATES PATENT AND TRADEMARK OFFICE
CERTIFICATE OF CORRECTION

PATENT NO. : 4,504,910
DATED : March 12, 1985
INVENTOR(S) : Shigeru Araki; Nobuhiko Suzuki It is certified that error appears in the above—identified patent and that said Letters Patent is hereby corrected as shown below:

On the Title Page, Item [73]  Assignee should read:

"Assignees:  Alps Electric Co., Ltd. and
             Honda Motor Co., Ltd. part interest"

Signed and Sealed this

Twentieth Day of October, 1987

Attest:

DONALD J. QUIGG

*Attesting Officer*  *Commissioner of Patents and Trademarks*